(12) United States Patent
Song et al.

(10) Patent No.: US 11,696,009 B2
(45) Date of Patent: Jul. 4, 2023

(54) CAMERA MODULE AND ELECTRONIC DEVICE HAVING THE CAMERA MODULE

(71) Applicant: TRIPLE WIN TECHNOLOGY(SHENZHEN) CO. LTD., Shenzhen (CN)

(72) Inventors: Jian-Chao Song, Guangdong (CN); Shin-Wen Chen, New Taipei (TW); Jing-Wei Li, Guangdong (CN); Sheng-Jie Ding, Guangdong (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 17/501,145

(22) Filed: Oct. 14, 2021

(65) Prior Publication Data

US 2022/0232150 A1 Jul. 21, 2022

(30) Foreign Application Priority Data

Jan. 19, 2021 (CN) .......................... 202110071231.1

(51) Int. Cl.
 *H04N 5/225* (2006.01)
 *H04N 23/55* (2023.01)
 *H04M 1/02* (2006.01)
 *H04N 23/52* (2023.01)

(52) U.S. Cl.
 CPC .......... *H04N 23/55* (2023.01); *H04M 1/0264* (2013.01); *H04N 23/52* (2023.01)

(58) Field of Classification Search
 CPC ........ H04N 23/51; H04N 23/52; H04N 23/54; H04N 23/55; H04M 1/0264
 USPC ......................................................... 348/374
 See application file for complete search history.

(56) References Cited

U.S. PATENT DOCUMENTS

| 2018/0035029 | A1* | 2/2018 | Wang | .................... | H04N 5/2253 |
| 2018/0095204 | A1* | 4/2018 | Lin | .......................... | G02B 5/003 |
| 2021/0018818 | A1* | 1/2021 | Cha | .......................... | G02B 7/09 |

FOREIGN PATENT DOCUMENTS

| CN | 105573020 A | * | 5/2016 | ............ | G02B 17/02 |
| CN | 208754380 U | * | 4/2019 | ......... | G02B 27/0018 |
| WO | WO-2019076352 A1 | * | 4/2019 | ............. | F16M 11/22 |

\* cited by examiner

*Primary Examiner* — Anthony J Daniels
(74) *Attorney, Agent, or Firm* — ScienBiziP, P.C.

(57) ABSTRACT

A camera module includes a circuit board, a lens assembly, a filter, and a mounting frame. The lens assembly is arranged on the circuit board, the mounting frame is arranged between the circuit board lens assembly. A through hole penetrates the mounting frame. A protrusion extends from an inner surface defining the through hole toward a central axis of the through hole. The filter is mounted on a side of the protrusion facing away from the circuit board. A first barrier layer is arranged on an edge area of a surface of the filter facing away from the circuit board. A gap is formed between the filter and the inner surface. A second barrier layer is located in the gap, and a surface of the second barrier layer facing away from the circuit board is located at a side of the first barrier layer facing away from the circuit board.

16 Claims, 6 Drawing Sheets

CAMERA MODULE AND ELECTRONIC DEVICE HAVING THE CAMERA MODULE

FIELD

The subject matter herein generally relates to a camera module and an electronic device having the camera module.

BACKGROUND

Electronic products (such as mobile phones or tablet computers, etc.) usually contain cameras. With the development of electronic products, people have put forward higher requirements for the shooting quality and performance of cameras. When the camera shoots a scene under strong light, some strong light at a specific angle may be reflected inside the lens barrel, and then reflected on the photosensitive chip, causing obvious spots or stains in the image, which affects the imaging quality.

BRIEF DESCRIPTION OF THE DRAWINGS

Implementations of the present disclosure will now be described, by way of embodiments, with reference to the attached figures.

DETAILED DESCRIPTION

Figure 1:
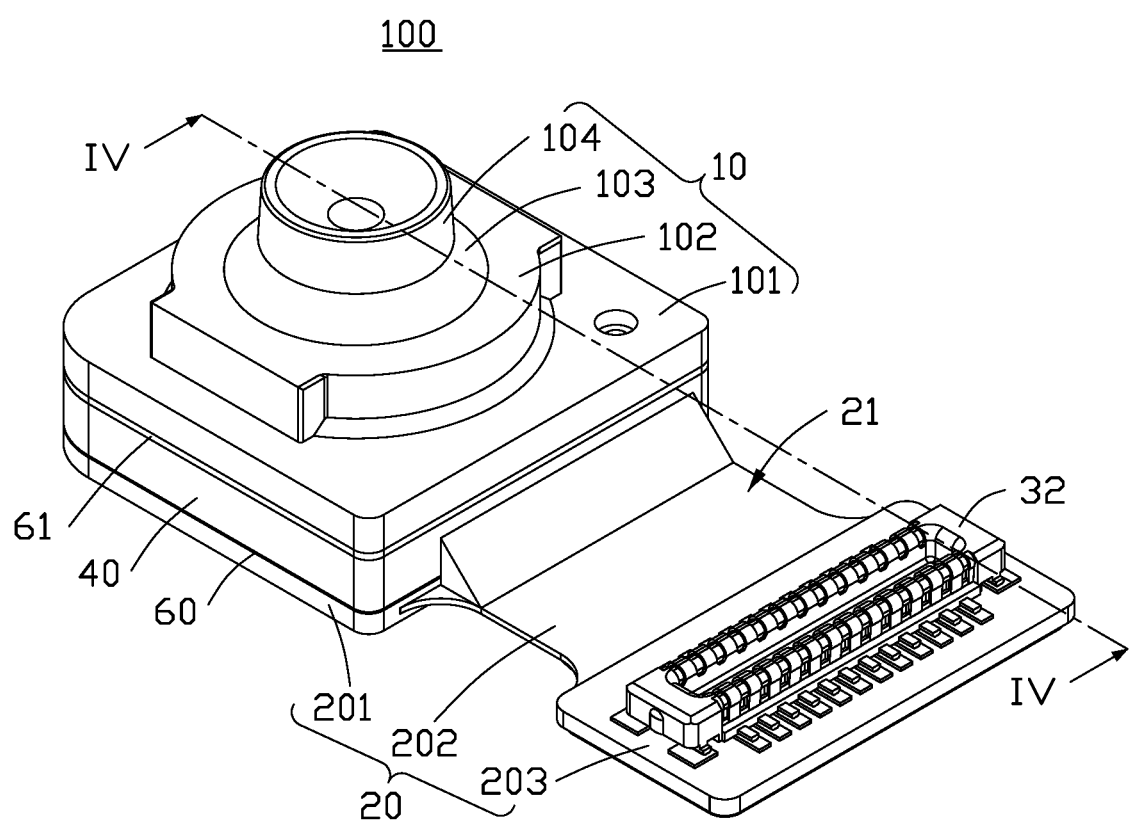
FIG. 1 is a diagram of an embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
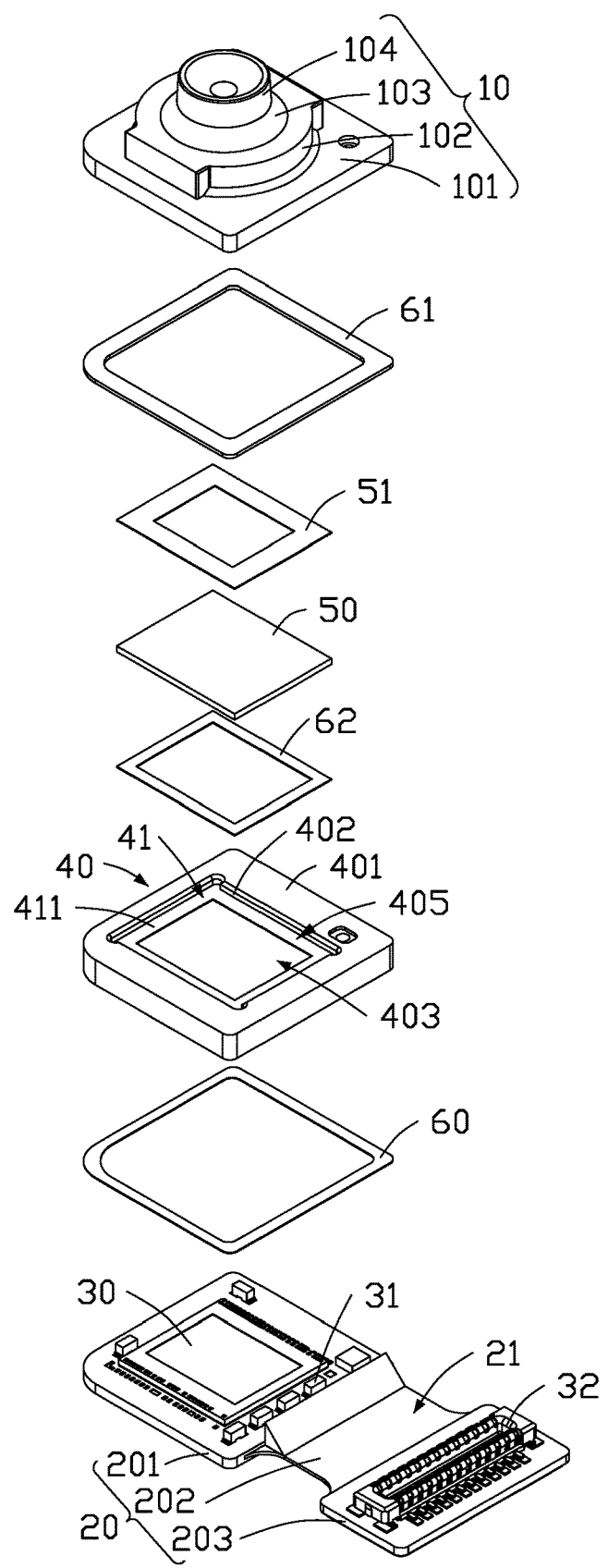
FIG. 2 is an exploded, diagrammatic view of an embodiment of a camera module according to the present disclosure.

FIG. 1 illustrates an embodiment of a camera module 100. The camera module 100 includes a circuit board 20 and a lens assembly 10. The lens assembly 10 is arranged on the circuit board 20. Referring to FIG. 2, a photosensitive chip 30, a mounting frame 40, and a filter 50 are arranged between the lens assembly 10 and the circuit board 20.

The circuit board 20 includes a first portion 201, a second portion 202, and a third portion 203. The lens assembly 10 is mounted on the first portion 201. The second portion 202 is connected between the first portion 201 and the third portion 203. A surface of the circuit board 20 facing the lens assembly 10 is defined as a base surface 21. The circuit board 20 may be a flexible circuit board, a rigid circuit board, or a flexible-rigid circuit board. In at least one embodiment, the circuit board 20 is a flexible-rigid circuit board. The first portion 201 and the third portion 203 are rigid portions of the circuit board 20, the second portion 202 is a flexible portion of the circuit board 20. An electrical connecting portion 32 is arranged on an area of the base surface 21 corresponding to the third portion 203. The electrical connecting portion 32 may be a connector or golden finger to realize signal transmission between the camera module 100 and other electronic components (not shown).

The photosensitive chip 30 is fixed on the base surface 21 and located on the first portion 201. A plurality of electronic elements 31 adjacent to the photosensitive chip 30 are arranged on the first portion 201. Each electronic element 31 may be a passive component such as a resistor, a capacitor, a diode, a transistor, a relay, or an electrically erasable programmable read-only memory.

Referring to FIG. 1 and FIG. 2, a first adhesive layer 60 is arranged between the circuit board 20 and the mounting frame 40 to fix the mounting frame 40 on the circuit board 20.

Figure 3:
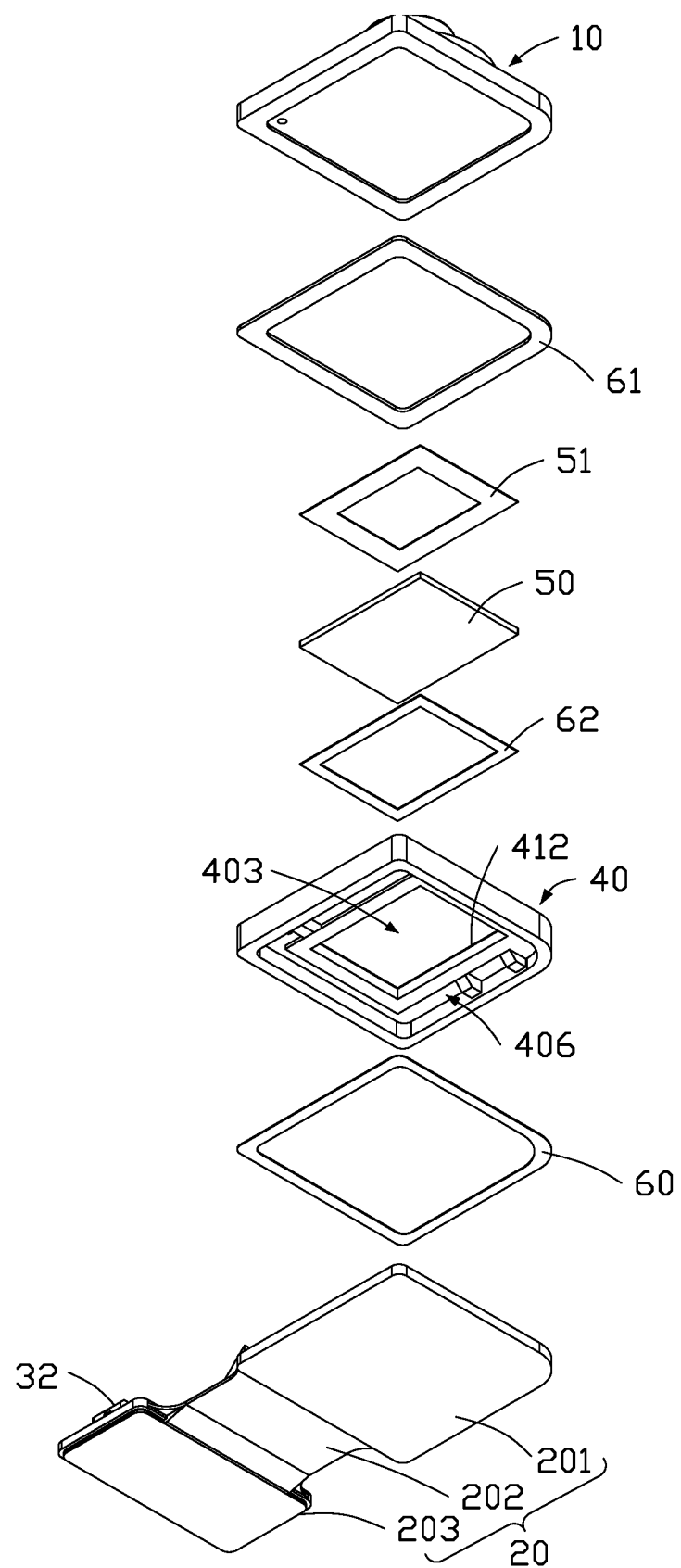
FIG. 3 is another exploded, diagrammatic view of an embodiment of a camera module according to the present disclosure.

Referring to FIG. 2 and FIG. 3, the mounting frame 40 is arranged between the lens assembly 10 and the circuit board 20. The mounting frame 40 may have a substantially square frame structure. A through hole 403 penetrates a center of the mounting frame 40. The through hole 403 may be square. In other embodiments, a shape of the mounting frame 40 and a shape of the through hole 403 may be varied as needed.

Figure 4:
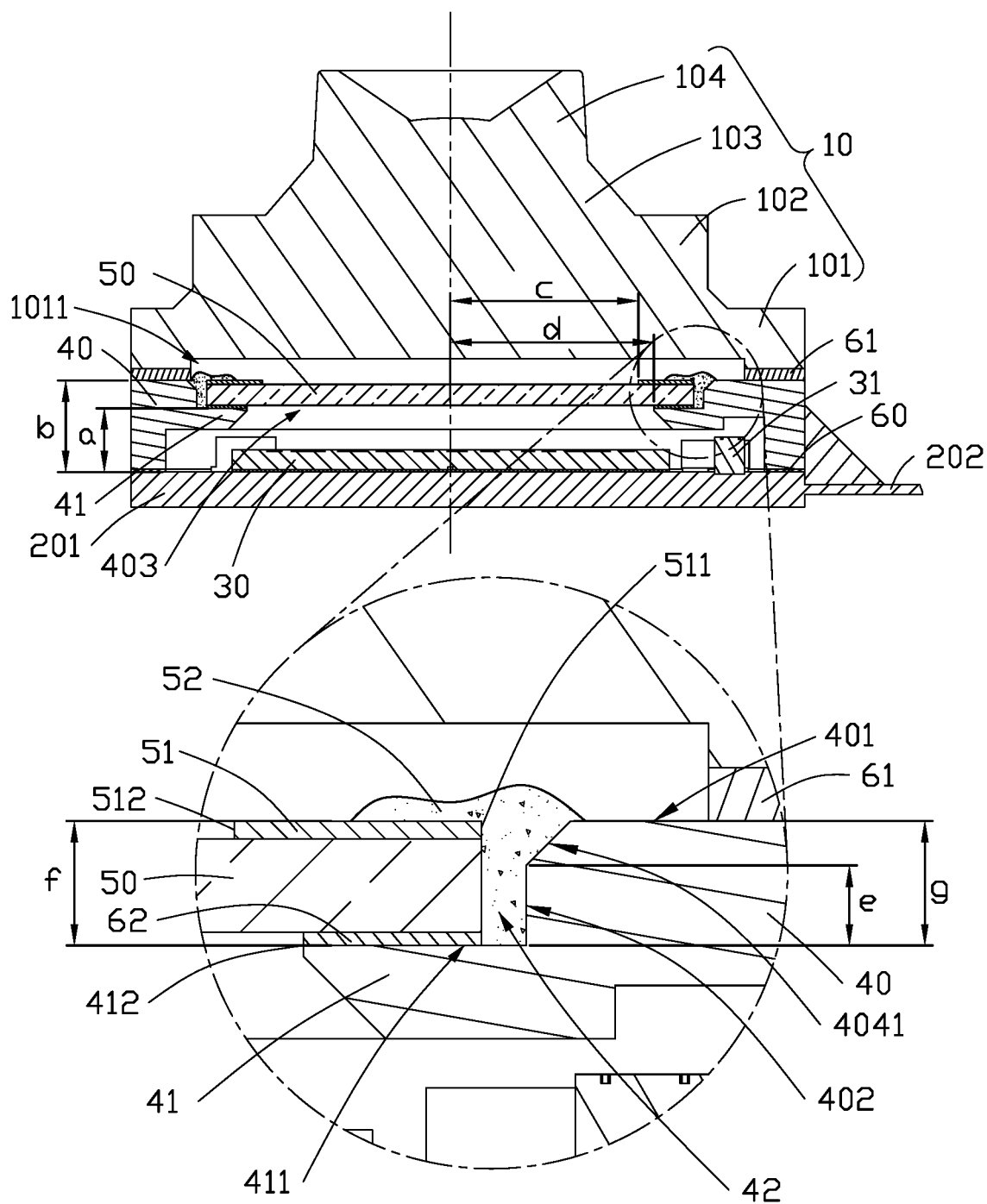
FIG. 4 is a cross-sectional view of an embodiment of the camera module taken along IV-IV line of FIG. 1.

The mounting frame 40 includes a top surface 401 facing away from the circuit board 20 and an inner surface 402 defining the through hole 403. A protrusion 41 extends from the inner surface 402 toward a central axis of the through hole 403. Referring to FIG. 4, the protrusion 41 includes a supporting surface 411 facing away from the circuit board 20. The inner surface 402 is connected between the top surface 401 and the supporting surface 411. A distance a between the supporting surface 411 and the base surface 21 is less than a distance b between the top surface 401 and the base surface 21.

Referring to FIG. 2 and FIG. 3, the protrusion 41 divides the mounting frame 40 into a first mounting area 405 and a second mounting area 406. The second mounting area 406 is located a side of the first mounting area 405 facing the circuit board 20. The photosensitive chip 30 and the electronic elements 31 are received in the second mounting area 406. The filter 50 (shown in FIG. 4) is mounted on the supporting surface 411 of the protrusion 41 and located in the first mounting area 405. That is, the filter 50 and the photosensitive chip 30 are located opposite sides of the protrusion 41. The filter 50 is fixed on the protrusion 41 through a second adhesive layer 62.

Referring to FIG. 2, FIG. 3 and FIG. 4, a first barrier layer 51 is arranged on an edge area of a surface of the filter 50 facing away from the circuit board 20. The first barrier layer 51 may be made of, but not limited to, black glue or light-shielding ink. The first barrier layer 51 can absorb light of different wavelengths, and can block strong light of a specific angle from being incident on the edge area of the surface of the filter 50 facing away from the circuit board 20 through the filter 50 and reflected on the photosensitive chip 30. The first barrier layer 51 includes a first end 511 and a second end 512 facing away from the first end 511. The first end 511 is flush with a periphery of the filter 50. An orthographic projection of an end 412 of the protrusion 41 facing to the center of the through hole 403 on a plane of the first barrier layer 51 coincides with the second end 512 of the first barrier layer 51 or is located between the first end 511 of the first barrier layer 51 and the second end 512 of the first barrier layer 51. That is, a distance c between the second end 512 of the first barrier layer 51 and a central axis of the through hole 403 is less than or equal to a distance d between the end 412 of the protrusion 41 and the central axis of the through hole 403. So that the first barrier layer 51 shields the protrusion 41, and light reflected on the photosensitive chip 30 through the protrusion 41 is reduced.

A gap 42 is formed between the filter 50 and the inner surface 402 of the mounting frame 40. A second barrier layer 52 is located in the gap 42, and a surface of the second barrier layer 52 facing away from the circuit board 20 is located at a side of the first barrier layer 51 facing away from the circuit board 20. The second barrier layer 52 may be made of black glue or light-shielding ink. The second barrier layer 52 may be made by injecting black glue or light-shielding ink in the gap 42.

A distance g between the top surface 401 of the mounting frame 40 and the supporting surface 411 of the protrusion 41 is greater than a distance f between the surface of the first barrier layer 51 facing away from the circuit board 20 between the supporting surface 411 of the protrusion 41. It is easier for a material of the second barrier layer 52 to flow to the first barrier layer 51 during injecting. So that the second barrier layer 52 may cover at least part of the first barrier layer 51, a corner area of the filter 50 may be completely covered by the first barrier layer 51 and the second barrier layer 52, thereby further preventing light being incident and reflected on the photosensitive chip 30 through the corner area of the filter 50. At the same time, the second barrier layer 52 can also prevent debris generated when the lens assembly 10 is in use from entering the second mounting area 406.

Referring to FIG. 4, the top surface 401 of the mounting frame 40 and the inner surface 402 of the mounting frame 40 are connected by a chamfer 4041. A distance e between the supporting surface 411 of the protrusion 41 and a junction of the chamfer 4041 and the inner surface 402 is less than the distance f between the surface of the first barrier layer 51 facing away from the circuit board 20 between the supporting surface 411 of the protrusion 41. The chamfer 4041 acts as a guide for black glue or light-shielding ink injected into the gap 42, which improves a production efficiency and a yield of the camera module 100.

Figure 5:
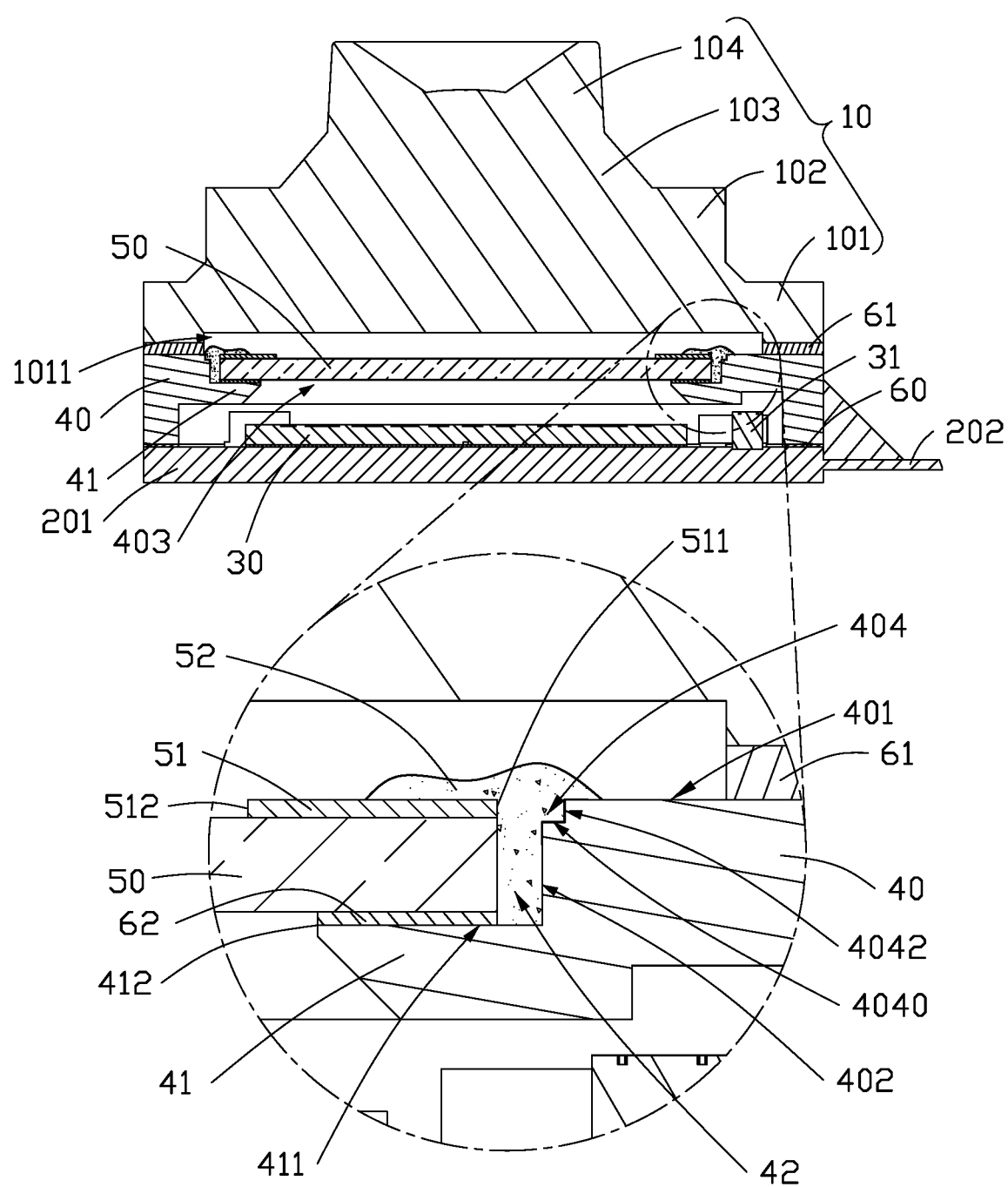
FIG. 5 is a cross-sectional view of another embodiment of the camera module taken along IV-IV line of FIG. 1.

In at least one embodiment, referring to FIG. 5, the top surface 401 of the mounting frame 40 and the inner surface 402 of the mounting frame 40 may be connected by a step 404. The step 404 includes a bottom surface 4040 and a side surface 4042 perpendicular to the bottom surface 4040. An end of the bottom surface 4040 facing away from the side surface 4042 is connected to the inner surface 402. An end of the side surface 4042 facing away from the bottom surface 4040 is connected to the top surface 401. In at least one embodiment, the top surface 401 of the mounting frame 40 and the inner surface 402 of the mounting frame 40 may be connected by a plurality of steps 404.

Referring to FIG. 4, the lens assembly 10 includes a lens holder 101, a first lens barrel 102, a second lens barrel 103, and a third lens barrel 104 sequentially connected along a thickness direction. An opening 1011 penetrates the lens holder 101 along the thickness direction. When the lens assembly 10 is fixed on the mounting frame 40, the opening 1011 corresponds to the through hole 403 of the mounting frame 40. In at least one embodiment, the lens holder 101 may be a rectangular parallelepiped. Inner diameters of the first lens barrel 102, the second lens barrel 103, and the third lens barrel 104 decrease in order. The lens holder 101, the first lens barrel 102, the second lens barrel 103, and the third lens barrel 104 may be integrally molded by plastic injection molding.

The lens assembly 10 may be fixed on the mounting frame 40 through a third adhesive layer 61.

Figure 6:
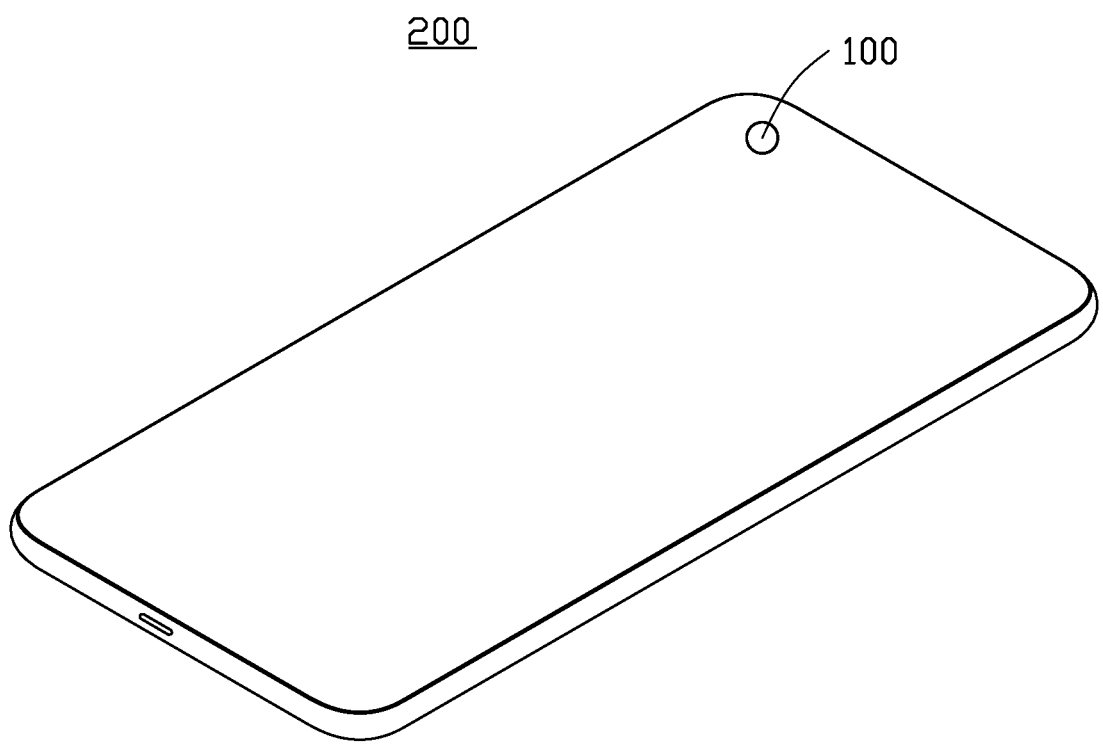
FIG. 6 is a diagram of an embodiment of an electronic device according to the present disclosure.

FIG. 6 illustrates an embodiment of an electronic device 200 including the above camera module 100. The electronic device 200 may be, but not limited to, a mobile phone, a wearable device, a vehicle, or a monitoring device.

The first barrier layer 51 is arranged on an edge area of a surface of the filter 50 facing away from the circuit board 20 to absorb light of different wavelengths, and block strong light of a specific angle from being incident on the edge area of the surface of the filter 50 facing away from the circuit board 20 through the filter 50 and reflected on the photosensitive chip 30. The second barrier layer 52 is located in the gap 42, and a surface of the second barrier layer 53 facing away from the circuit board 20 is located at a side of the first barrier layer 51 facing away from the circuit board 20, thereby further preventing light being incident and reflected on the photosensitive chip 30 through the corner area of the filter 50. So that the light spots in the captured image is reduced, the sharpness of the captured image and the imaging quality can be improved.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
   a circuit board;
   a lens assembly;
   a filter; and
   a mounting frame;
   wherein the lens assembly is arranged on the circuit board, the mounting frame is arranged between the circuit board and the lens assembly; a through hole penetrates the mounting frame, a protrusion extends from an inner surface defining the through hole toward a central axis of the through hole, the filter is mounted on a side of the protrusion facing away from the circuit board, a first barrier layer is arranged on an edge area of a surface of the filter facing away from the circuit board, a gap is formed between the filter and the inner surface of the mounting frame, a second barrier layer is located in the gap, a surface of the second barrier layer facing away from the circuit board is located at a side of the first barrier layer facing away from the circuit board, the mounting frame comprises a top surface facing away from the circuit board, the lens assembly is fixed on the top surface, and the second barrier layer further covers at least part of the top surface.

2. The camera module of claim 1, wherein the second barrier layer further covers at least part of the first barrier layer.

3. The camera module of claim 1, wherein the protrusion comprises a supporting surface facing away from the circuit board, the filter is arranged on the supporting surface;
the inner surface is connected between the top surface and the supporting surface, a distance between the supporting surface and the circuit board is less than a distance between the top surface and the circuit board.

4. The camera module of claim 3, wherein the top surface of the mounting frame and the inner surface of the mounting frame are connected by a chamfer.

5. The camera module of claim 4, wherein a distance between the supporting surface of the protrusion and a junction of the chamfer and the inner surface of the mounting frame is less than a distance between the surface of the first barrier layer facing away from the circuit board and the supporting surface of the protrusion.

6. The camera module of claim 3, wherein the top surface of the mounting frame and the inner surface of the mounting frame is connected by a step.

7. The camera module of claim 3, wherein the first barrier layer comprises a first end facing the inner surface of the mounting frame and a second end facing away from the first end, the first end is flush with a periphery of the filter.

8. The camera module of claim 7, wherein an orthographic projection of an end of the protrusion facing to the central axis of the through hole on a plane of the first barrier layer coincides with the second end of the first barrier layer or is located between the first end of the first barrier layer and the second end of the first barrier layer.

9. An electronic device comprising:
a camera module comprising:
a circuit board;
a lens assembly;
a filter; and
a mounting frame;
wherein the lens assembly is arranged on the circuit board, the mounting frame is arranged between the circuit board and the lens assembly; a through hole penetrates the mounting frame, a protrusion extends from an inner surface defining the through hole toward a central axis of the through hole, the filter is mounted on a side of the protrusion facing away from the circuit board, a first barrier layer is arranged on an edge area of a surface of the filter facing away from the circuit board, a gap is formed between the filter and the inner surface of the mounting frame, a second barrier layer is located in the gap, a surface of the second barrier layer facing away from the circuit board is located at a side of the first barrier layer facing away from the circuit board, the mounting frame comprises a top surface facing away from the circuit board, the lens assembly is fixed on the top surface, and the second barrier layer further covers at least part of the top surface.

10. The electronic device of claim 9, wherein the second barrier layer further covers at least part of the first barrier layer.

11. The electronic device of claim 9, wherein the protrusion comprises a supporting surface facing away from the circuit board, the filter is arranged on the supporting surface;
the inner surface is connected between the top surface and the supporting surface, a distance between the supporting surface and the circuit board is less than a distance between the top surface and the circuit board.

12. The electronic device of claim 11, wherein the top surface of the mounting frame and the inner surface of the mounting frame are connected by a chamfer.

13. The electronic device of claim 12, wherein a distance between the supporting surface of the protrusion and a junction of the chamfer and the inner surface of the mounting frame is less than a distance between the surface of the first barrier layer facing away from the circuit board and the supporting surface of the protrusion.

14. The electronic device of claim 11, wherein the top surface of the mounting frame and the inner surface of the mounting frame is connected by a step.

15. The electronic device of claim 11, wherein the first barrier layer comprises a first end facing the inner surface of the mounting frame and a second end facing away from the first end, the first end is flush with a periphery of the filter.

16. The electronic device of claim 15, wherein an orthographic projection of an end of the protrusion facing to the central axis of the through hole on a plane of the first barrier layer coincides with the second end of the first barrier layer or is located between the first end of the first barrier layer and the second end of the first barrier layer.

* * * * *